United States Patent [19]

Hanna et al.

[11] Patent Number: 5,299,830
[45] Date of Patent: Apr. 5, 1994

[54] SAFETY BELT PRE-TENSION ASSEMBLY

[75] Inventors: Harry Hanna, Armagh; William E. Heaney, Bangor, both of Ireland

[73] Assignee: European Components Corporation, Wilmington, Del.

[21] Appl. No.: 857,382

[22] Filed: Mar. 25, 1992

[30] Foreign Application Priority Data

Mar. 26, 1991 [GB] United Kingdom ............... 9106450

[51] Int. Cl.[5] ................................................ B60R 22/46
[52] U.S. Cl. ................................. 280/806; 297/480; 242/107.4 B
[58] Field of Search ............... 280/806, 807, 801 R, 280/805; 297/474, 475, 478, 480; 242/107.4 A, 107.4 B

[56] References Cited

U.S. PATENT DOCUMENTS

| 1,256,848 | 2/1918 | Uttz | 280/749 |
| 1,936,251 | 11/1933 | McCollough | 280/749 |
| 4,458,921 | 7/1984 | Chiba et al. | 280/806 |
| 4,545,546 | 10/1985 | Kawaguchi et al. | 280/806 |
| 4,917,210 | 4/1990 | Danicek et al. | 280/806 |

FOREIGN PATENT DOCUMENTS

| 0173903 | 3/1986 | European Pat. Off. | |
| 0361075 | 4/1990 | European Pat. Off. | |
| 3341568 | 6/1985 | Fed. Rep. of Germany | 280/806 |
| 3923724 | 1/1991 | Fed. Rep. of Germany | 280/806 |
| 0253444 | 11/1991 | Japan | 280/806 |

Primary Examiner—Margaret A. Focarino
Assistant Examiner—Paul Dickson
Attorney, Agent, or Firm—Lyman R. Lyon

[57] ABSTRACT

The safety belt pre-tension assembly comprises a support 14, a safety belt buckle 10 mounted on the support for axial displacement relative to the support, a housing 40, a winding reel 44 mounted within the housing and a helical power spring 52 associated with the reel to cause rotation of the winding reel. A flexible cable 34 has one end connected to the winding reel, so that the flexible cable will be wound thereon upon operation of the power spring. The other end of the flexible cable 34 is connected to the buckle 10 to move the buckle axially in a first direction effective to tension a safety belt held by the buckle. Actuation means 54-70 are provided to trigger actuation of the spring 52 upon the actuation means being subjected to a deceleration greater than the predetermined value. Locking means 26-32 are provided to allow the buckle to move in the first direction only, but not in the opposite direction.

6 Claims, 2 Drawing Sheets

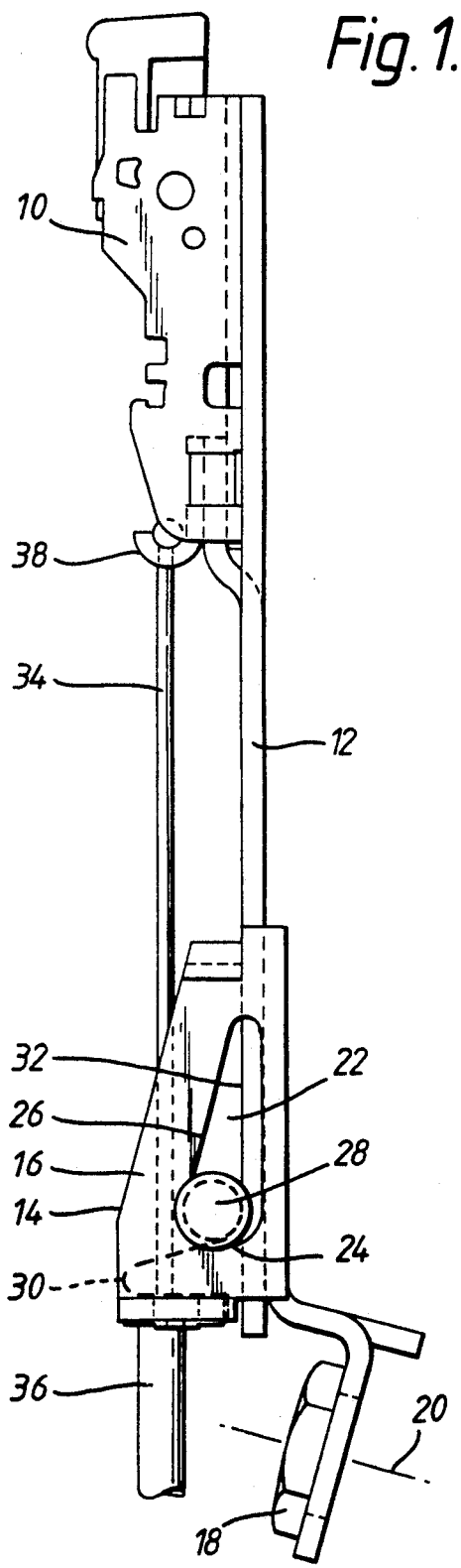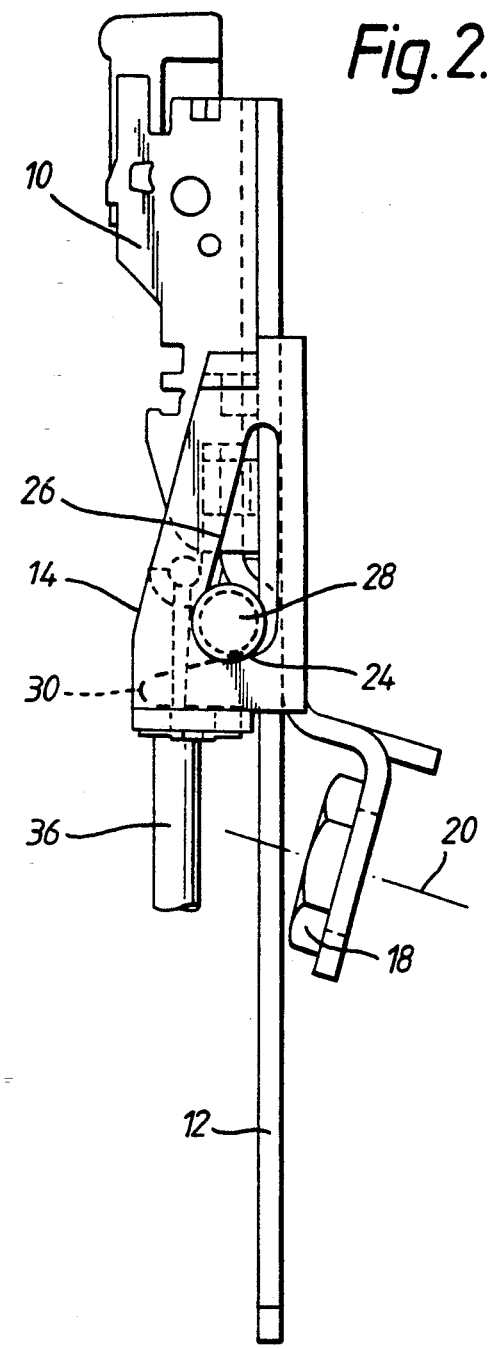

SAFETY BELT PRE-TENSION ASSEMBLY

The present invention relates to a buckle pretensioner for a safety belt.

Safety belts for vehicles include a safety belt which is usually wound on a retractable reel, a tongue connected to the belt and a buckle which is attached to the vehicle in a secure manner. Normally there is some form of actuating mechanism which prevents the belt from unreeling when the vehicle is subjected to acceleration, deceleration or corning, to provide an acceleration force beyond predetermined value. This can be done in a number of different ways including various forms of mechanism to stop the belt itself from unreeling and means to clamp the belt downstream of the reel.

Necessarily, there is some degree of slack in the belt to allow the wearer the ability to move a little. Suggestions have been made to provide a pre-tensioner assembly which moves the buckle rearwardly of the vehicle when the vehicle is subjected to a violent deceleration, and in particular deceleration resulting from an impact. However, known systems have not proved satisfactory because they can be cumbersome, expensive and/or unreliable.

It is now proposed, according to the present invention, to provide a safety belt pre-tension assembly comprising a support, a safety belt buckle mounted on said support for axial displacement relative to said support, a housing, a winding reel rotatable in said housing, a helical power spring associated with said reel to cause rotation of said winding reel, a flexible element having one end connected to said winding reel, so that said flexible element will be wound thereon upon operation of said power spring, the other end of said flexible element being connected to said buckle, to move said buckle axially of said support in a first direction, effective to tension a safety belt held by said buckle, actuation means to trigger actuation of said helical spring upon the actuation means being subjected to a deceleration greater than a predetermined value and locking means allowing said buckle to move in said first direction, but not in a direction opposite thereto.

Such can be made relatively inexpensively and can be very compact while still being reliable in operation.

The actuating means, in a preferred construction, includes an annular internal ratchet having inwardly directed ratchet teeth and a pawl cooperable therewith to prevent rotation of said reel when the pawl is engaged with the ratchet teeth and means to disengage said pawl from the ratchet teeth upon a deceleration greater than said predetermined value.

The means to disengage the pawl from the ratchet teeth can take a number of different forms but in an advantageous structure according to the invention, the pawl is pivotally mounted on said housing and said means to disengage the pawl comprise a toggle mechanism including a sensing lever pivotally mounted on said housing and a toggle link pivotally attached both to said sensing means and said pawl, the pivot point of said sensing lever to the housing and the pivot points of said toggle lever to said sensing lever and said pawl being substantially aligned when said pawl is engaged with one of said ratchet teeth, deceleration above said predetermined value causing said sensing lever to pivot with respect to the winding reel, thereby causing said toggle link and said pawl to pivot, whereby the pawl is disengaged from the associated ratchet tooth.

When it is desired to set up the assembly according to the invention, it is necessary to tension the helical power spring. This can be done by providing a suitable formation, e.g. a hexagonal head, on the reel, and using a spanner or the like to rotate the reel against the action of the spring. Thereafter, in a desirable construction, an actuating pin mounted on the sensing lever, is arranged to be slidable in an arcuate slot in the housing, said slot being centered on the pivot point of the arcuate lever, the actuating pin being manually operable to move the sensing lever, and thus the toggle link and pawl, into the pawl engaging position.

Various forms of locking means are contemplated, but in a preferred construction according to the present invention, the locking mechanism support is mounted on an elongate member axially slidable with respect to said elongate member in said first direction, said buckle being mounted on said elongate member, a rotatable locking element mounted on said elongate member for rolling engagement with a first surface formed on said elongate member and an inclined second surface, converging towards said first surface in a direction opposite to said first direction, whereby said locking element jams between said first and second surfaces, when said elongate body is moved in a direction opposite to said first direction, thereby locking said elongate member against further such movement.

While the locking element may be in the form of one or more balls which may, for example, be movable in a groove in the elongate member and a groove in the first surface, in a preferred construction the locking element is in the form of a roller and the elongate member includes two apertures having inclined convergent walls, one of which forms the first surface, said roller portions being engaged in the apertures.

For ease of operation, the locking element may be urged in said opposite direction by a biasing spring.

The elongate member may take many forms but in a simple construction it is in the form of a metal strap to which the buckle is secured.

Similarly the elongate flexible element may be in the form of a belt but is advantageously in the form of a cable, for example a Bowden cable provided with a sleeve.

In order that the present invention may more readily be understood, the following description is given, merely by way of example, reference being made to the accompanying drawings in which:

FIG. 1 is a side elevation of the buckle and associated locking means of one embodiment of assembly according to the invention shown in the normal position;

FIG. 2 is a similar view showing the buckle and elongate member moved to the actuated position;

Figure 3:
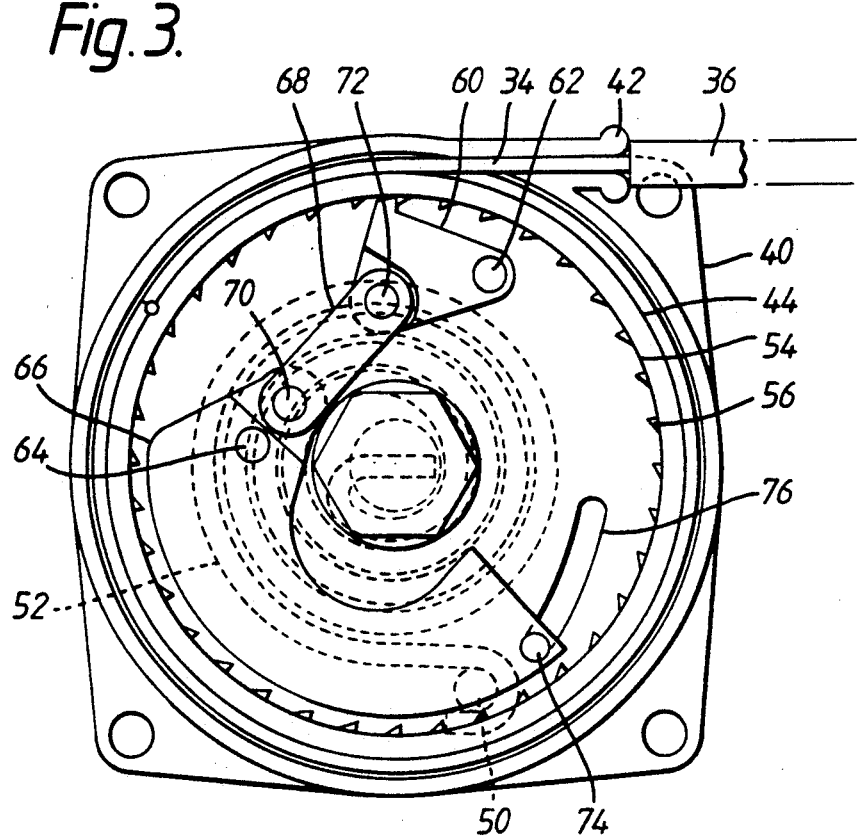
FIG. 3 is a schematic plan view of one embodiment of reel, flexible element and actuating means of an assembly according to the invention in the normal position.

Referring first now to FIG. 1, there is illustrated therein a conventional seat belt buckle 10. This is mounted on an elongate member in the form of a metal strap 12 which is slidable in a locking mechanism support 14 having two upstanding side walls 16 which act as a guide for axial movement of the metal strap 12. The support 14 has associated therewith a holding nut 18 which may be secured in a rigid manner to the vehicle or, alternatively, may allow a certain amount of pivoting about the axis 20 of the nut.

The locking mechanism support 14 is designed to prevent upward (as seen in the drawing) movement of the strap 12 and thus of the buckle 10. This is achieved by means of the two walls 16 each being provided with an aperture in the form of a triangular slot 22 having an end surface 24 and an inclined surface 26. The two apertures provide a mounting for a rotatable element in the form of a roller 28. The roller is urged upwardly (as seen in the drawings) by a biasing U-spring 30 so that the circumference of the roller abuts on the one hand a first surface, that being the surface 32 of the metal strap 12, and a second surface, being the inclined surfaces 26. Any tendency for the strap 12 to move upwardly will be prevented by the roller 28 jamming between the surfaces 26,32 because these are convergent in an upward direction.

It will be seen that associated with the buckle 10 is a flexible element 34 in the form of a Bowden cable having a sleeve 36, the cable being secured to the buckle 10 at 38.

Figure 4:
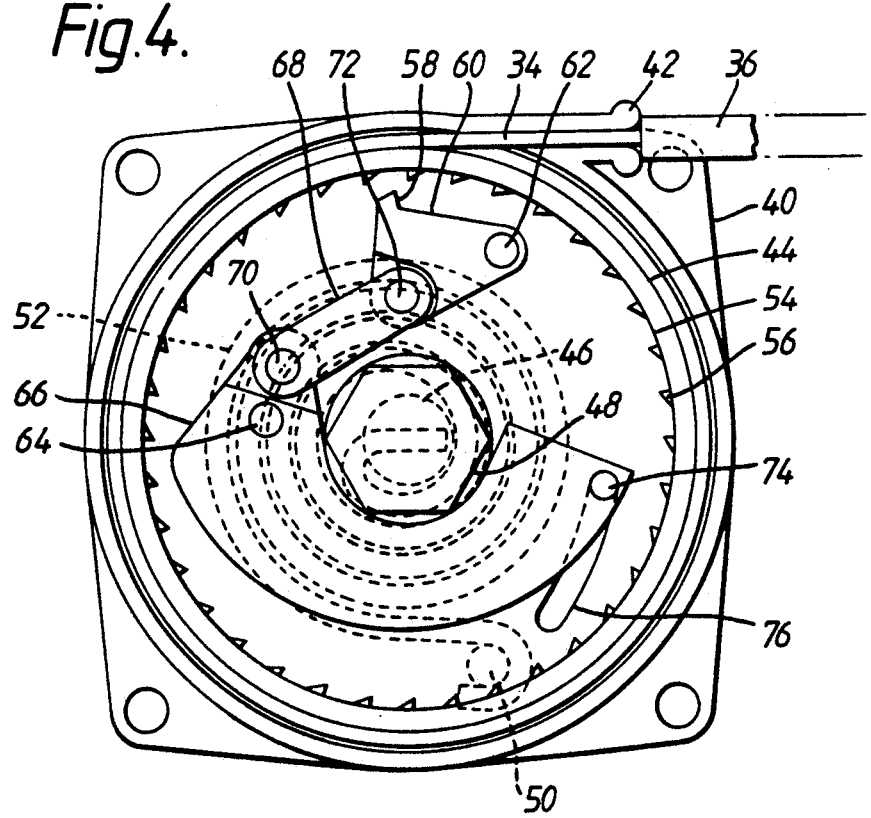
FIG. 4 is very similar to FIG. 3 showing the same mechanism in the actuated position.

If reference is now made to FIG. 3, it will be seen that the Bowden cable 34 passes into a housing 40 by means of a guide 42 and is wrapped around a groove in the outer surface of a reel 44 which is in the form of a cylindrical drum mounted for rotation about a shaft 46 (see FIG. 4) rotation of the shaft can be effected by engagement of a spanner on a hexagon head 48.

The housing has an anchoring 50 for a helical leaf power spring 52 which is wrapped around the shaft 46 and is engaged through an aperture therein.

The inner surface of the reel 44 is formed as an annular ratchet 54 having radially inwardly extending ratchet teeth 56. These teeth are engaged by the nose 58 of a pawl 60 which is pivotally mounted to the housing on pivot 62. Also pivotally mounted to the housing at 64 is a sensing lever 66 which is of arcuate form and in effect provides a pivotal inertia member. A toggle link 68 is pivotally connected at 70 to the sensing lever 66 and at 72 to the pawl 60.

Extending axially from the sensing lever 66 is an actuating pin 74 which passes through an arcuate slot 76 centred on the pivot point 64 of the sensing lever 66.

In order to set up the described assembly, the reel 44 is rotated clockwise, by means of the hexagon head 48 against the anti-clockwise movement exerted on it by the power spring 52. The actuating member 74 is then pivoted in a clockwise sense (from the position of FIG. 4 to the position of FIG. 3) thus rotating the sensing lever 66 clockwise, pushing up the toggle link 70 and thereby rotating the pawl 60 clockwise until the nose 58 of the pawl engages a tooth 56 of the ratchet 54, so restraining the reel from rotating anti-clockwise.

Now if the whole assembly is decelerated by an amount over and above a preselected value, usually of the order of at least 7g, for example by the vehicle hitting an obstacle, the inertia mass of the sensing lever 66 will cause it to rotate in an anti-clockwise direction about its pivot 64.

The effect of this will be to rotate the toggle link 70 in a clockwise direction, thereby turning the pawl 60 in an anti-clockwise direction, sufficiently to disengage its nose 58 from the associated tooth 56 of the ratchet. The power spring 52 will then be allowed to operate and will cause the drum 44 to rotate rapidly in an anti-clockwise direction and will apply a tension to the cable 34 which will be drawn sharply inwardly around the drum. This movement will cause the buckle, and with it the metal strap 12, to move rapidly downwardly in a first direction. The spring 30 will allow the roller 28 to move slightly to enable this motion to take place easily and rapidly.

It will be appreciated that at the same time as the inertia force produced by the rapid deceleration causes this to happen, the belt will be simultaneously tensioned as the weight of the user is applied against it. This will tend to cause the buckle to move in the opposite direction but the inclined surface 26 and the upper surface 32 of the strap 12 will engage the roller thereby preventing such movement in the opposite direction and thereby restrain movement of the buckle so that the belt will firmly hold the passenger.

We claim:

1. In a safety belt assembly comprising a buckle, a belt wound on a retractable reel and a tongue connected to said belt and engageable with said buckle, a safety belt pre-tension assembly comprising a locking mechanism support, a safety belt buckle mounted on said support for axial displacement relative to said support, a housing, a winding reel rotatable in said housing, a helical power spring associated with said reel to cause rotation of said winding reel, a flexible element having one end connected to said winding reel, so that said flexible element will be wound thereon upon operation of said power spring, the other end of said flexible element being connected to said buckle, to move said buckle axially of said support in a first direction, effective to tension a safety belt held by said buckle, actuation means to trigger actuation of said helical spring upon the actuation means being subjected to a deceleration greater than a predetermined value and locking means allowing said buckle to move in said first direction, but not in a direction opposite thereto, said actuation means comprising an annular internal ratchet, inwardly directed ratchet teeth on said annular ratchet and a pawl pivotally mounted on said housing and cooperable with said ratchet teeth to prevent rotation of said winding reel when said pawl is engaged with the ratchet teeth, a toggle mechanism to disengage said pawl from the ratchet teeth upon deceleration greater than said predetermined value, said toggle mechanism including a sensing lever pivotally mounted at a first pivot point to said housing and a toggle link pivotally mounted at a second pivot point to said sensing lever and at a third pivot point to said pawl, said first, second and third pivot points being substantially aligned when said pawl is engaged with one of said ratchet teeth, deceleration above said predetermined value being effective to cause said sensing lever to pivot with respect to the winding reel, effective to cause said toggle link and said pawl to pivot, whereby the pawl is disengaged from the associated ratchet tooth.

2. An assembly as claimed in claim 1, and further comprising an arcuate slot in said housing, said arcuate slot being centered on said first pivot point, an actuating pin on said sensing lever, slidable in said arcuate slot in the housing, said actuating pin being manually operable to move the sensing lever and thus the toggle link and pawl into the pawl engaging position.

3. In a safety belt assembly comprising a buckle, a belt wound on a rectractable reel and a tongue connected to said belt and engageable with said buckle, a safety belt pretension assembly comprising a locking mechanism support, a safety belt buckle mounted on said support for axial displacement relative to said support, a housing, a winding reel rotatable in said housing, a helical power spring associated with said reel to cause rotation of said winding reel, a flexible element having one end connected to said winding reel, so that said flexible element will be wound thereon upon operation of said power spring, the other end of said flexible element being connected to said buckle, to move said buckle axially of said support in a first direction, effective to tension a safety belt held by said buckle, actuation means to trigger actuation of said helical spring upon the actuation means being subjected to a deceleration greater than a predetermined value and locking means allowing said buckle to move in said first direction, but not in a direction opposite thereto, an elongate member axially slidable with respect to said locking mechanism support in said first direction, said buckle being mounted on said elongate member, a first surface formed on said elongate member and an inclined second surface, converging towards said first surface in a direction opposite to said first direction, a rotatable locking element mounted on said elongate member for rolling engagement with said first and second surfaces, whereby said locking element jams between said first and second surfaces, when said elongate body is moved in a direction opposite to said first direction, thereby locking said elongate member against further such movement.

4. An assembly as claimed in claim 3, wherein the locking element is in the form of a roller and wherein the body includes two apertures having inclined convergent walls, one of which forms said first surface, said roller having portions engaged in said apertures.

5. An assembly as claimed in claim 3 and further comprising a biasing spring urging said locking element in said opposite direction.

6. An assembly as claimed in claim 3, wherein said elongate member is a metal strap to which said buckle is secured.

* * * * *